(12) United States Patent  (10) Patent No.: US 9,298,818 B1
Donneau-Golencer et al.  (45) Date of Patent: Mar. 29, 2016

(54) METHOD AND APPARATUS FOR PERFORMING SEMANTIC-BASED DATA ANALYSIS

(75) Inventors: Thierry Donneau-Golencer, Menlo Park, CA (US); Kenneth Nitz, Redwood City, CA (US); David Dunkley, Cambria, CA (US)

(73) Assignee: SRI International, Menlo Park, CA (US)

( * ) Notice: Subject to any disclaimer, the term of this patent is extended or adjusted under 35 U.S.C. 154(b) by 543 days.

(21) Appl. No.: 13/149,319

(22) Filed: May 31, 2011

Related U.S. Application Data

(60) Provisional application No. 61/349,687, filed on May 28, 2010.

(51) Int. Cl.
 *G06F 17/30* (2006.01)

(52) U.S. Cl.
 CPC ................................ *G06F 17/30749* (2013.01)

(58) Field of Classification Search
 None
 See application file for complete search history.

(56) References Cited

U.S. PATENT DOCUMENTS

| | | | |
|---|---|---|---|
| 6,347,313 B1* | 2/2002 | Ma | G06F 17/30256 707/711 |
| 6,658,623 B1* | 12/2003 | Schilit et al. | 715/208 |
| 7,870,136 B1* | 1/2011 | Cohen et al. | 707/737 |
| 8,001,152 B1* | 8/2011 | Solan | G06F 17/2785 707/791 |
| 8,185,523 B2* | 5/2012 | Lu | G06F 17/30554 707/723 |
| 8,447,640 B2* | 5/2013 | Golan | G06Q 10/10 705/7.13 |
| 2003/0172066 A1* | 9/2003 | Cooper et al. | 707/7 |
| 2006/0059144 A1* | 3/2006 | Canright et al. | 707/5 |
| 2007/0050343 A1* | 3/2007 | Siddaramappa | G06F 17/30908 |
| 2007/0174255 A1* | 7/2007 | Sravanapudi | G06Q 30/02 |
| 2008/0104032 A1* | 5/2008 | Sarkar | G06F 17/3089 |
| 2008/0168135 A1* | 7/2008 | Redlich et al. | 709/204 |
| 2008/0189269 A1* | 8/2008 | Olsen | G06F 17/30864 |
| 2010/0004975 A1* | 1/2010 | White | G06Q 30/0201 705/7.29 |
| 2010/0057723 A1* | 3/2010 | Rajaram | G06F 17/30864 707/E17.032 |
| 2010/0070448 A1* | 3/2010 | Omoigui | 706/47 |
| 2010/0179933 A1* | 7/2010 | Bai | G06F 17/30663 706/12 |
| 2011/0072012 A1* | 3/2011 | Ah-Pine | G06F 17/30274 707/725 |
| 2013/0041921 A1* | 2/2013 | Cooper | G06F 17/30672 707/780 |

\* cited by examiner

*Primary Examiner* — Wilson Lee
(74) *Attorney, Agent, or Firm* — Moser Taboada

(57) ABSTRACT

A computer implemented method and apparatus for analyzing content of a plurality of documents. The method extracts semantic information from content of a plurality of documents; assigns weights to the semantic information; assigns links between documents containing similar semantic information; assigns a weight to each link; extracts information about the content of the plurality of documents by using the weighted links and weighted semantics to cluster the documents, perform inferential analysis, or both.

16 Claims, 8 Drawing Sheets

METHOD AND APPARATUS FOR PERFORMING SEMANTIC-BASED DATA ANALYSIS

CROSS-REFERENCE TO RELATED APPLICATIONS

This application claims benefit of U.S. provisional patent application Ser. No. 61/349,687, filed May 28, 2010, which is herein incorporated by reference.

GOVERNMENT RIGHTS IN THIS INVENTION

This invention was made with U.S. government support under Air Force Research Laboratory Contract Number FA8750-09-D-0183. The U.S. government has certain rights in this invention.

BACKGROUND OF THE INVENTION

1. Field of the Invention

Embodiments of the present invention generally relate to data analysis techniques and, more particularly, to a method and apparatus for performing semantic-based data analysis.

2. Description of the Related Art

The amount of data gathered and organized by individuals, businesses, and governments is growing at a staggering rate. The ability to extract useful information from the immense amount of available data has become acute. The use of keyword and/or key phrase searching, commonly known as bag of words (BoW) searching, is limited in its ability to extract useful information from a database. Using keywords and/or key phrases is useful in finding specific information within a database; however, such searching is not useful in searches requiring an understanding of the meaning of words (e.g. semantic searches) or deriving inferences amongst data sets.

Therefore, there is a need in the art for a method and apparatus for performing semantic-based data analysis.

SUMMARY OF THE INVENTION

Embodiments of the invention comprise a computer implemented method and apparatus for analyzing content of a plurality of documents. The method extracts semantic information from content of a plurality of documents; assigns weights to the semantic information; assigns links between documents containing similar semantic information; assigns a weight to each link; extracts information about the content of the plurality of documents by using the weighted links and weighted semantics to cluster the documents, perform inferential analysis, or both.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention comprise a computer implemented method and apparatus for performing semantic-based data analysis. The method processes data to extract semantic information and weights the semantic information based upon characteristics of the data. The weighted semantic information is processed to identify inferences related to the data and/or to identify clusters of related data.

Figure 1:
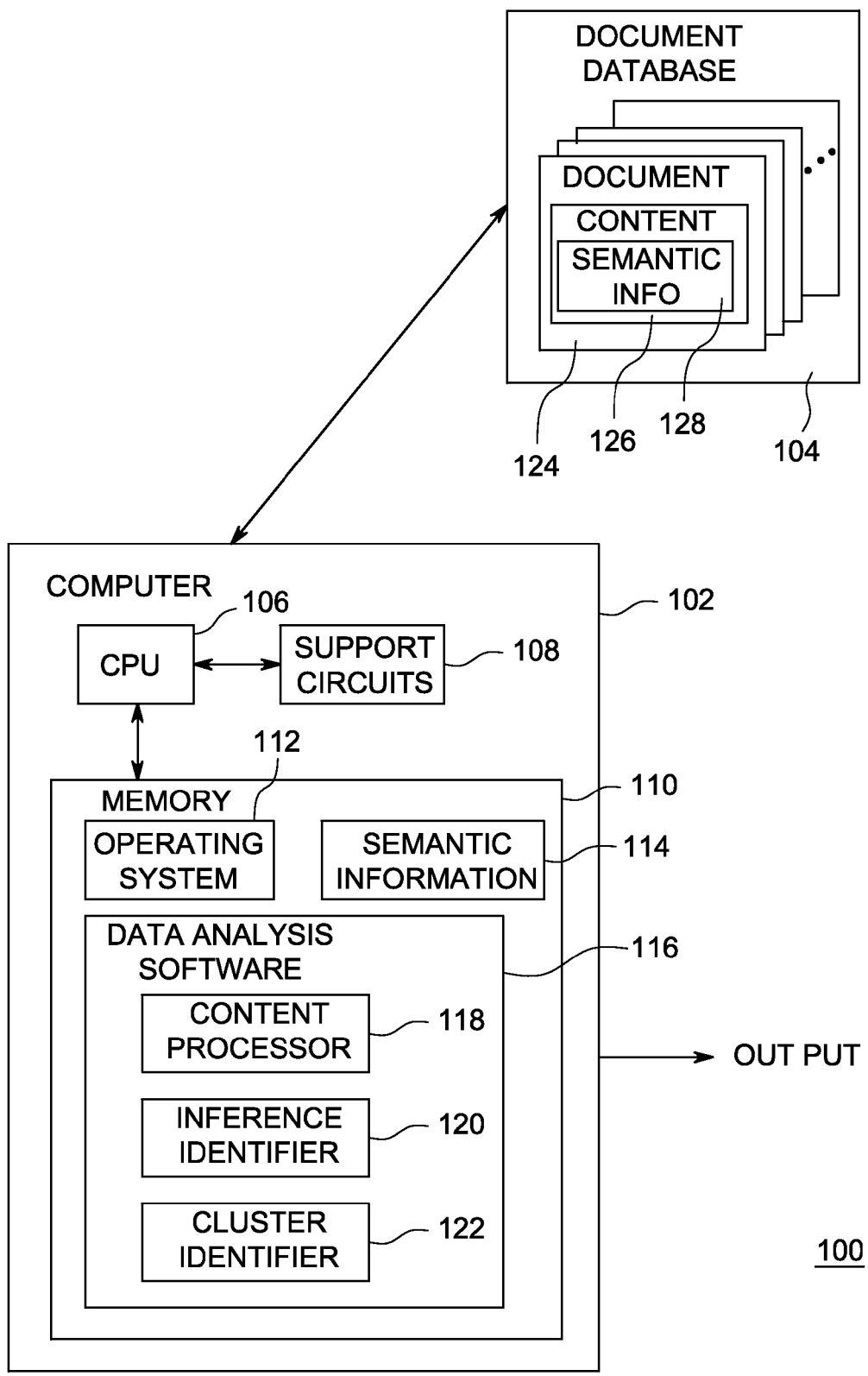
FIG. 1 depicts a block diagram of a computer system used to implement at least one embodiment of the present invention.

FIG. 1 depicts a block diagram of a computer system 100 used to implement at least one embodiment of the present invention. The computer system 100 may be a standalone computer or a network of computers including, for example, desktop computers, laptop computers, servers, tablet computers, personal digital assistants, handheld computing devices, cellular telephone, and the like. Although the computer system 100 depicts a standalone computer, embodiments of the invention may be implemented using interconnected computing devices to enable, for example, a handheld device to access a server and perform the embodiments of the invention described herein. As such, various functions of the software executed by the computer system 100 as described below may be executed on a single computer or on disparate computing devices.

The computer system 100 comprises a computer 102 coupled to a document database 104. The computer 102 comprises a central processing unit (CPU) 106, support circuits 108, and memory 110. The CPU 106 comprises one or more of available processors or controllers that are used to execute software instructions. They support circuits 108 include well-known circuits generally known to support the functionality of the CPU 106 such as clock circuits, power supplies, data registers, network interfaces, input/output circuits, cache and the like. The memory 110 comprises any form of digital storage including, for example, at least one of random access memory, read-only memory, disk drive, removable storage, and the like.

The memory 110 stores an operating system (OS) 112, semantic information 114, and data analysis software 116. The operating system 112 may be any one of the available operating systems used to support the functionality and operation of the computer 102. In one embodiment of the invention, the data analysis software 116 comprises three components: content processor 118, inference identifier 120, and a cluster identifier 122. The data analysis software 116 and its various components are described with respect to FIGS. 2 through 9 below.

The document database 104 is a database of information accessible by the computer 102. The document database may comprise a plurality of databases that are accessible by the computer 102. The document database 104 stores a plurality of documents 124. As used herein, the word "document" is meant to include any information comprising textual information. Such documents may include government documents, e-mail, webpages, social network information, printed publications, and any other grouping of information that can be processed as described below. Each document 124 comprises content 126 including semantic information 128. Although the foregoing describes a single computer 102, the functions of the computer 102 may be provided through cloud computing or a software as a service product.

Figure 2:
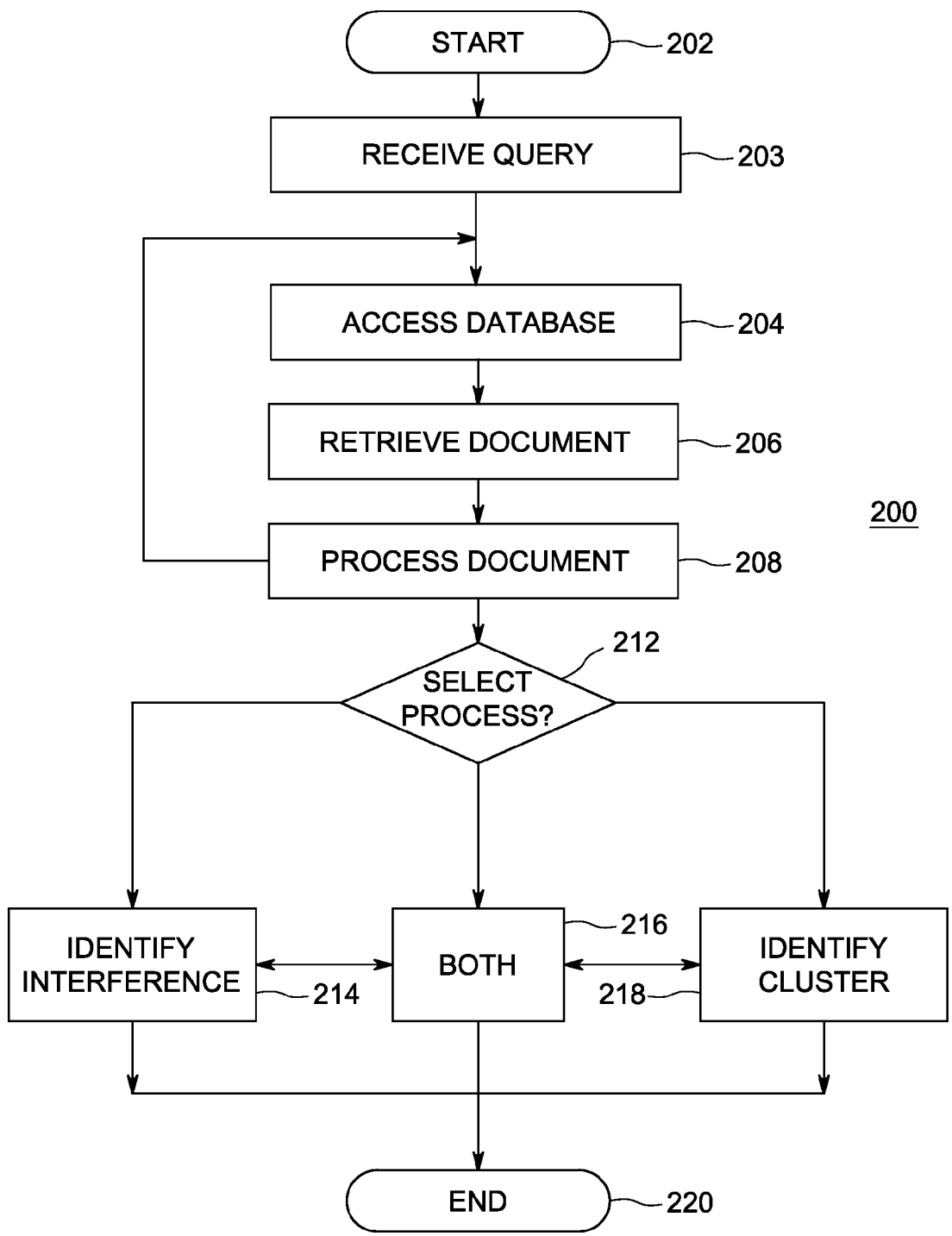
FIG. 2 depicts a flow diagram of a method for analyzing information from a database using semantic-based data analysis in accordance with at least one embodiment of the present invention.

FIG. 2 depicts a flow diagram of a method 200 for analyzing information from a database in accordance with at least one embodiment of the present invention. The method 200 forms one embodiment of the data analysis software 116 as executed by the CPU 106 as a computer implemented method. Such execution transforms a general purpose computer into a specific purpose computer for performing data analysis.

The method begins at step 202 and proceeds to step 203. At step 203, the method 200 receives a query (typically from a user) to find certain information, e.g., find all persons that know Person A? In other embodiments, a query signal is not necessary to begin the process. The semantic analysis, tagging, inference analysis and linking may be performed as a pre-processing step. At step 204, the method 200 accesses the database (e.g., database 104 in FIG. 1) containing information relevant to the query. At step 206, a document (e.g., document 124 in FIG. 1) is retrieved from the database. The method 200 processes the retrieved document at step 208. The processing performed at step 208 identifies at least one semantic within the document content. One embodiment of an implementation for the document processing performed at step 208 is described in detail with respect FIG. 3. As is further described with respect to FIG. 3, within step 208, the method 200 queries whether additional documents are to be processed. If the query is affirmatively answered, the method 200 proceeds to step 204, where the database is accessed to retrieve an additional document. If, on the other hand, the query is negatively answered, the method 200 proceeds to step 212.

At step 212, the method 200 selects a process to be used to analyze the e.g., extracted semantics within the document(s). The selection may be automated or manual (i.e., user selected). In one embodiment of the invention, the method 200 selects whether to perform inference analysis, cluster analysis, or both.

If, at step 212, the method 200 selects inference analysis, the method proceeds to step 214 to identify at least one inference within the content of the document(s). One embodiment of a method for performing inference analysis is described with respect to FIGS. 4, 5 and 6. Alternatively, the method 200 may select to perform cluster analysis and, therefore, proceed to step 218. One embodiment of a method for performing cluster analysis is described with respect to FIGS. 7, 8 and 9. Lastly, the method 200 may select to perform both an inference analysis and a cluster analysis upon the document(s). To perform both analyses, method 200 proceeds from query step 212 to step 216, where both an inference analysis (step 214) and a cluster analysis (step 218) are performed. The method 200 ends at step 220.

Figure 3:
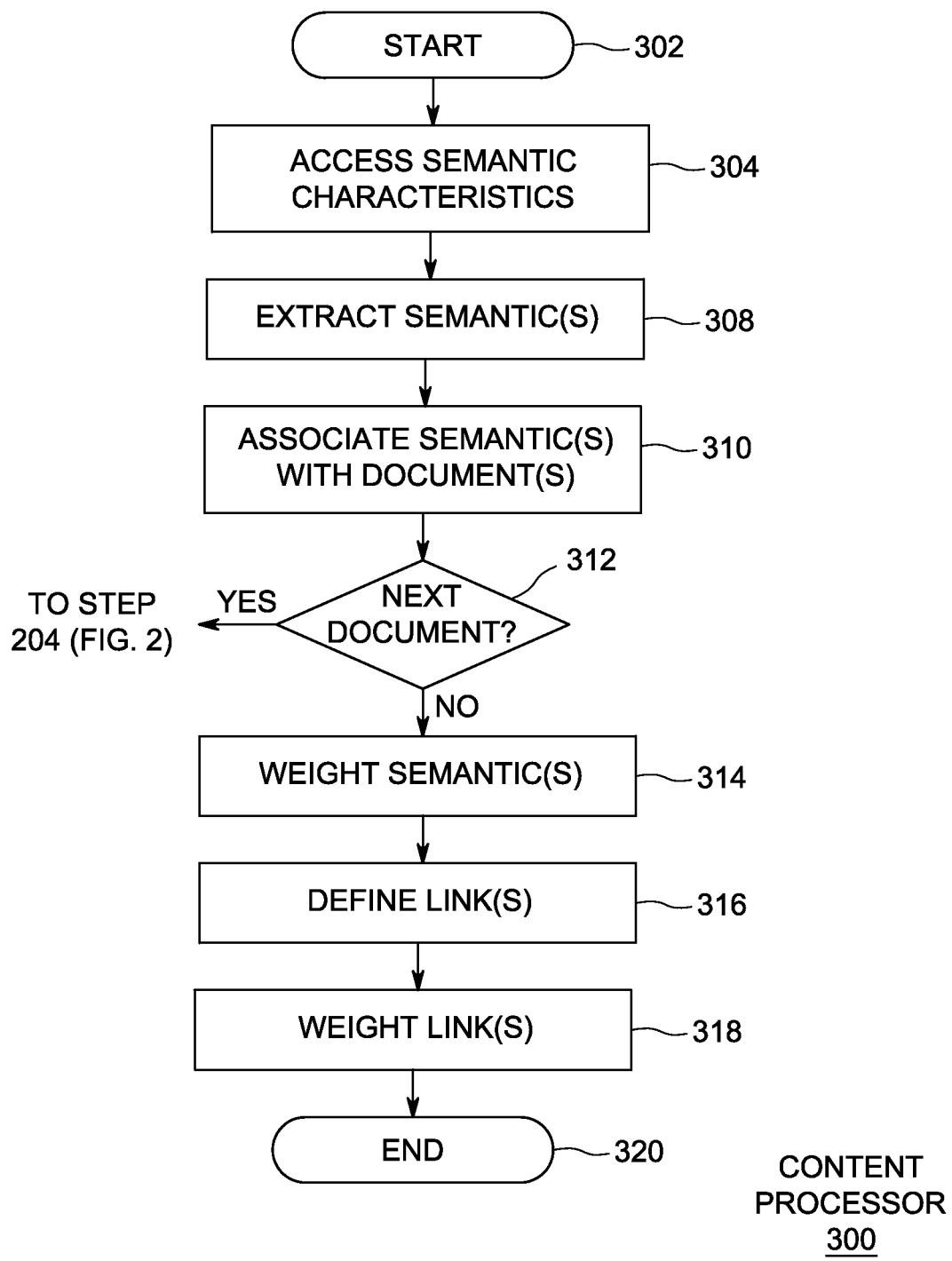
FIG. 3 depicts a flow diagram of a method for processing content of a document in accordance with at least one embodiment of the present invention.

FIG. 3 depicts a flow diagram of a method 300 for processing content of a document in accordance with at least one embodiment of the present invention. The method 300 represents one embodiment of an implementation of the content processor 118 of FIG. 1. The method 300 begins at step 302 and proceeds to step 304. At step 304, the method 300 accesses semantic characteristics that will be used to selectively extract semantics from the document content. In one embodiment, these semantic characteristics include a semantic type and a semantic feature. For example, semantic types comprise general categories of phone numbers, names, titles, addresses, college attendance, birth dates, publication topics, and the like; while features are specific instances of those types. For example, a type may be "city", while a feature associated with the type "city" may be a specific city, such as "San Francisco". The selection of semantic characteristics is infinite and is generally limited only by the desired scope of the data analysis.

At step 308, the method 300 extracts at least one semantic from the document content. The semantics are extracted based upon the specified semantic characteristics for the particular information to be found. For example, the characteristics may be predefined to define information of interest comprising a feature defining a specific name of a person, e.g., John Smith, as well as a semantic type, e.g., city. For this example, the semantics within documents would include John Smith as well as any city in a document containing that name.

At step 310, the method 300 associates the extracted semantics with the various documents such that the documents are tagged to identify from which documents the semantics were extracted. In some embodiments of the invention, the tags and their related documents may be presented to a user in a list. The list may summarize the number of documents containing each of the semantic characteristics. In a further embodiment, selecting (clicking on) a semantic tag in the list displays the documents from which the semantic information was found. Other information may also be displayed via selection or "hovering over" an entry in the list.

At step 312, the method 300 queries whether another document is to be processed and have semantics extracted. If the query is affirmatively answered, the method 300 returns to step 204 of FIG. 2. If no further documents are to be processed, the method 300 proceeds to step 314.

At step 314, the method 300 computes and applies a probabilistic weight to each of the semantics. The weights represent the importance associated with each semantic. The importance level represents the importance of a particular semantic to the query being answered by the search. Weights may be assigned using a number of different techniques. To name a few; weights may be assigned based upon term frequency, or linear inverse or log inverse term frequency. In term frequency, weight in higher weighting is assigned to terms that are more frequent within the documents. The method 300 counts the appearances of each term and assigns a weight.

In linear inversion weighting, the method 300 counts the total number of appearances of a term in a document (term frequency) and the number of documents in which the term appears (document frequency). A weight is assigned as follows:

$$w = \text{term frequency} * \left( \frac{\text{\# documents} - \text{document frequency}}{\text{document frequency}} \right)$$

In log inverse weighting, weights are assigned as follows:

$$w = \text{term frequency} * \log\left( \frac{\text{\# documents}}{\text{document frequency}} \right)$$

In some instances, a term may have a weight that is biased to a higher level because the term represents high value information. In yet other embodiments, the term frequency may be normalized to prevent bias towards longer documents.

At step 316, the method 300 to find links amongst the documents representing commonality of semantic information within the documents. The links may be between documents or within a single document. At step 318, the links are weighted to represent a confidence level as to the commonality of the semantic information across documents. In one embodiment, the weight is computed by counting the number of common semantics, i.e., the more common semantics between two documents, the higher the link weight.

In one embodiment, information gleaned from the links amongst documents, within the documents and the semantics may be displayed as a list of beliefs related to a particular semantic. The beliefs are a representation of the probabilistic strength of the evidence gathered from the documents, e.g., a strong belief occurs when a multitude of documents corroborate a particular semantic. For example, given a particular person's name, various beliefs regarding their address, profession, places visited, and so on may be created and displayed.

The method 300 ends at step 320.

Figure 4:
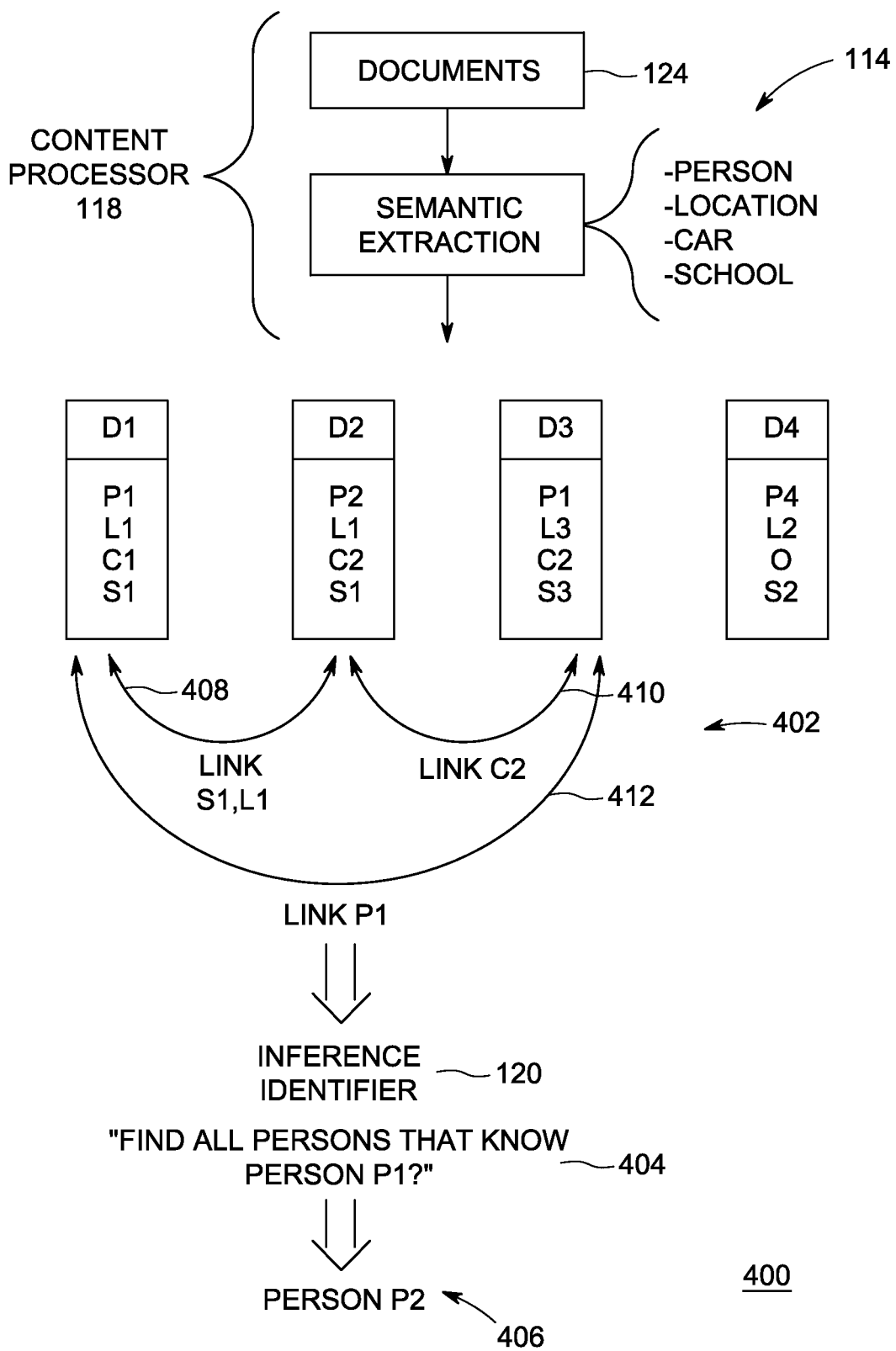
FIG. 4 depicts a schematic representation of one aspect of data analysis performed in accordance with at least one embodiment of the invention.

FIG. 4 depicts a schematic representation 400 of the content processing and inferential identification processing performed by the content processor 118 and inference identifier 120 of FIG. 1. As discussed with respect to FIG. 3, the content processor 118 processes documents 124 and extracts semantics (a portion of semantic information 114). The "types" of semantics that are to be extracted in the example of FIG. 4 include a person identifier (e.g., name), a location (e.g., residence address), car information (e.g., make and model) and school information (e.g., school attended). Each of these "types" is weighted. For example, if the inference analysis is being performed to determine persons that are known by other persons, names and locations would be highly relevant (higher weight) while the type of car a person drives would be less relevant (lower weight).

In the example, document D1 contains semantic information regarding person p1, location 11, car c1 and school s1; document D2 contains person p2, location 11, car c2, and school s1; document D3 contains person p1, location 13, car c2, school s3; end document D4 contains person p4, location 12, no information about a car, and school s2. Documents D1 and D2 are linked (link 408) through common information regarding school s1 and location 11; documents D2 and D3 are linked (link 410) through common information regarding car c2; documents D1 and D3 are linked (link 412) through common information regarding person p1; and document D4 does not contain any information linking it to any other documents. The weighting of each link depends on the weighting of the semantic that links the documents as well as the amount of common information between two documents. For example, in a search regarding contact amongst people, the make/model of car the person drives is less significant than a match between their location, school or the person's name. As such, a link between documents derived solely from matching car information would have a lesser weight than a link derived from a match of a person's name or residence address.

When the inference identifier (described in detail below with respect to FIG. 5) performs the inference analysis using a query 404: "find all persons that know person P1?", the result 406 is person P2. There would be a high level of confidence in the decision that person p1 knows person p2 since the link between person p1 in person p2 is based on a common school attendance and a common location (e.g., highly weighted semantics and link for this particular query). Although there is no single document specifically containing person p1 and person p2 to specifically connect these persons, the inference analysis derives their knowledge of each other from disparate documentation in accordance with at least one embodiment of the invention.

Figure 5:
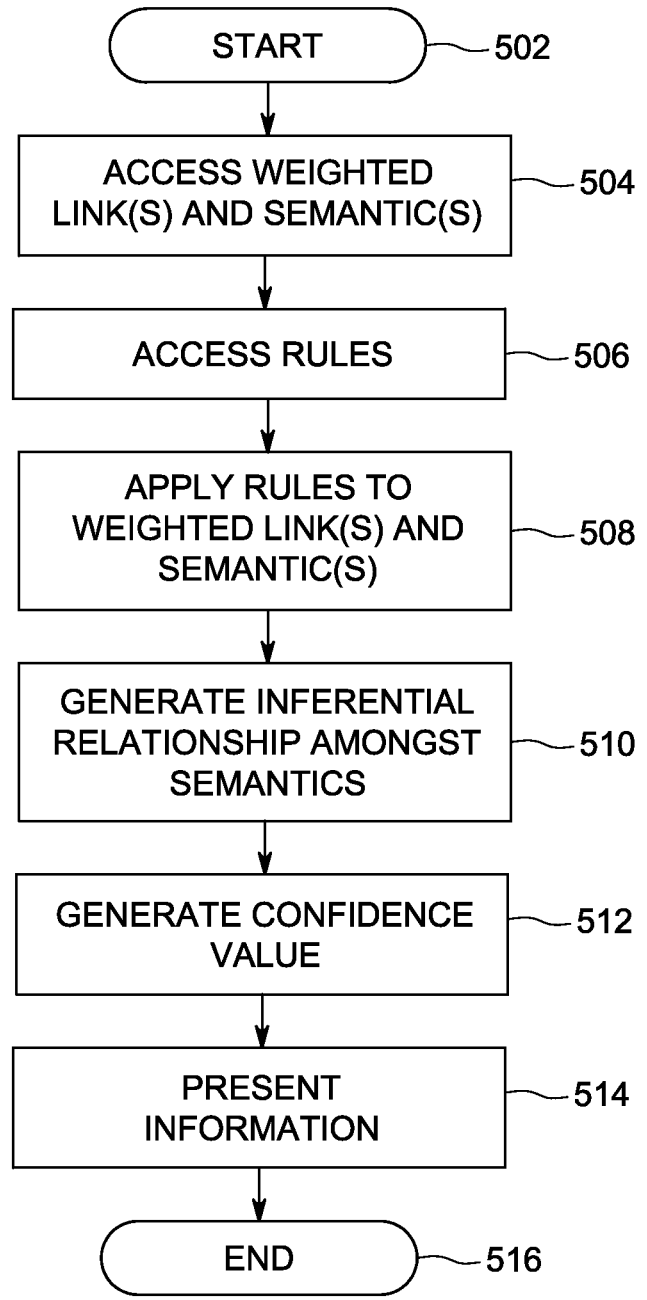
FIG. 5 depicts a flow diagram of a method for identifying inferences within a data set in accordance with at least one embodiment of the present invention.

FIG. 5 depicts a flow diagram of a method 500 for identifying inferences within a data set in accordance with at least one embodiment of the present invention. The method 500 represents one embodiment of an implementation of the inference identifier 120 of FIG. 1. The method 500 begins at step 502 and proceeds to step 504. At step 504, the method 500 accesses the weighted links and semantics. The combination of weighted links and semantics is referred to herein as a data set.

At step 506, the method 500 accesses specific rules that are to be used to determine inferences within the data set. At step 508, the method 500 applies the rules to the data set (e.g., weighted links and semantics). In one embodiment, the rules may also be weighted. In one embodiment, the rules are predefined to exploit associations amongst the semantics within the data set. From the application of the rules, at step 510, the method 500 generates at least one inferential relationship amongst these semantics.

The inferential analysis is performed in a hierarchical fashion, first inferring a number of basic beliefs and, from the basic beliefs, developing higher level inferences. For example, extraction of a phone number and a person's name in close proximity in a single document may be converted into a basic belief that the phone number and the person are related, i.e., the phone number is the person's phone number. If the relationship appears in multiple documents, the confidence level of the belief will be higher. As more instances of the relationship are identified, the confidence level is increased.

The basic inferences are obtained through co-referenced rule-based analysis. The co-reference rules for linking semantics about entities include for example: entries are close together in the text, in a list together, or part of a directory, hierarchy, list of authors, etc., entities are mentioned in the same location or approximate time, verb groupings (e.g., met, saw, had dinner with, etc.) and the like. Higher level inferences are discussed below by way of example, which build upon these basic inferences.

At step 512, the method 500 generates a confidence value for each inferential relationship. The confidence value is derived from the weightings of the links and semantics as well as the number of occurrences of the links and semantics. In addition, the confidence level may include the confidence of particular documents containing accurate information.

At step 514, the method 500 presents the resulting inferential relationships for consideration by a user. In one embodiment, the information is presented in the form of any inference graph as described in connection with FIG. 6 below. The method ends at step 516.

Figure 6:
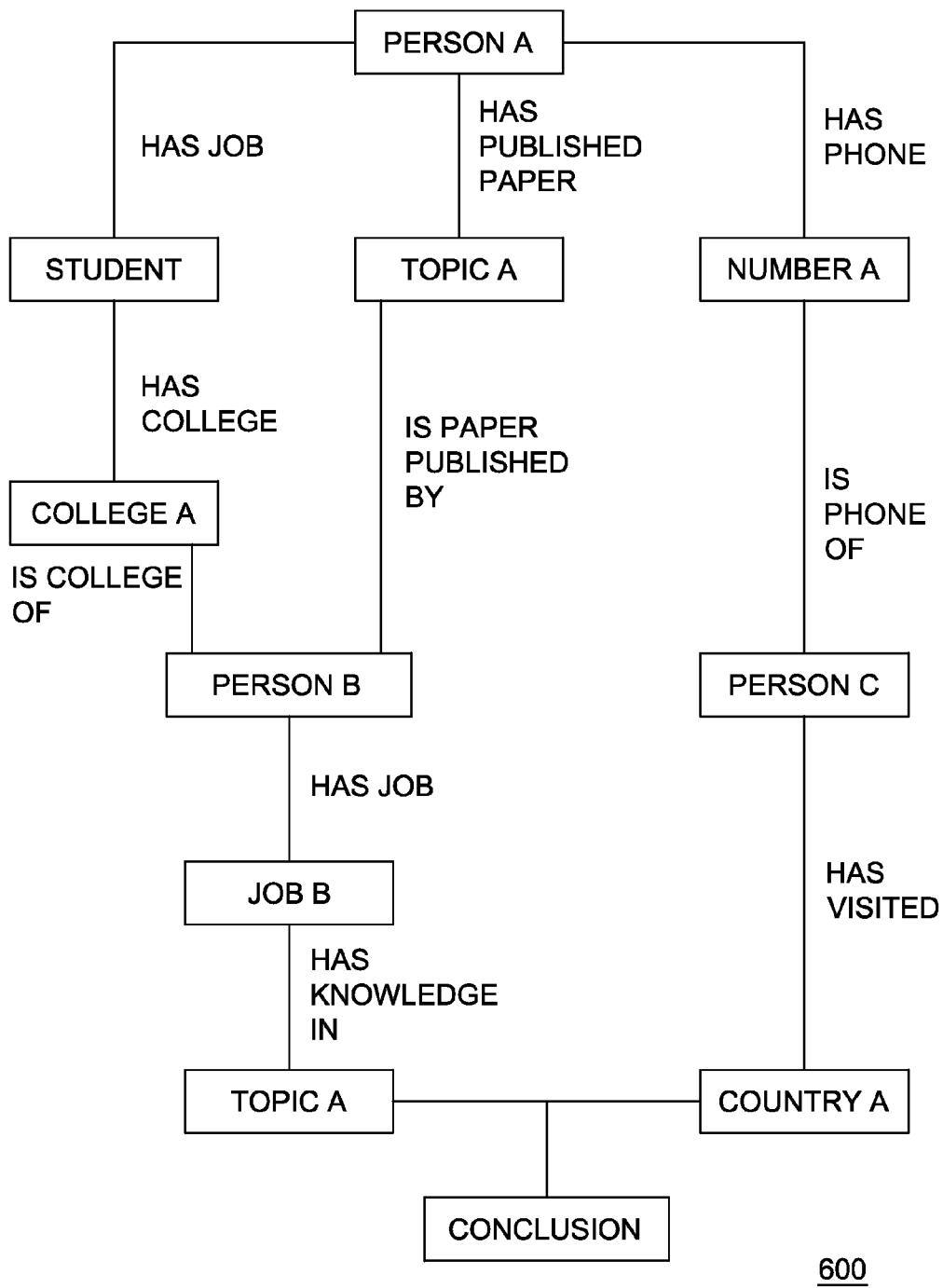
FIG. 6 depicts an inference graph for displaying a chain of inferences produced by at least one embodiment of the present invention.

FIG. 6 depicts an inference graph 600 that may be produced by one embodiment of the inference identifier in connection with the following example. The extracted semantics may represent a particular set of factual beliefs as follows:

Person A is a Student at College A
Person A has published a paper on Topic A
Person A has a phone number: Number A
Person B is a Professor at College A
Person B has published a paper on Topic A
Person B is knowledgeable about Topic A
Person C has a phone number: Number A
Person C has visited Country A By applying the rules of the inference identifier, inferential beliefs are gleaned from this data set to include: Persons A and C are roommates (they have the same phone number), Person A knows Person B (same college and paper topic) and so on. Further inferential beliefs can be derived that do not rely on any specific connection between the semantics. For example, as a conclusion: Person A can be inferred to know about Country A (his roommate has visited Country A). If the rules were designed to identify potential terrorist threats, Country A may be a country on the terrorist watch list, and Topic A may be a sensitive technology, e.g., nuclear physics. Consequently, Person A would be identified as a person to watch through their knowledge of a terrorist country and their connection to nuclear physics.

Although the foregoing embodiments described the inferential analysis as being performed by a predefined rules set, the rules may automatically be updated/modified using artificial intelligence techniques to improve the inference results. Furthermore, additional semantic types may be added to extract additional relevant information as the inference identifier learns by example and generalizes the analysis. Additional documents and databases can be identified to improve the inference analysis. Such additions can be identified through user feedback upon review of the inference conclusions. Documents and databases can be either added or deleted from the set used in the inferential analysis. In view of such feedback, confidence values as well as semantic and link weighting can be adjusted to improve results.

More specifically, the inferential analysis, using various artificial intelligence techniques, may learn and improve the inference outcome in various ways. For example, the system may be taught new semantic types to look for and extract from documents, e.g., temperature, latitude/longitude, and the like. In one embodiment, a user may demonstrate some instances of a new semantic type and the system learns by example and generalizes. In other embodiments, a user may manually add new documents and/or other evidence to the inferential analysis. These new documents and/or evidence will be taken into account when the inferential analysis computes new beliefs or update existing beliefs. In another embodiment, a user can provide explicit feedback (positive and/or negative) to the inferential analysis on some of the evidence extracted or inferences computed. The inferential analysis method may learn from this new information, propagating feedback and updating beliefs as needed. In another embodiment, the inferential analysis process learns from implicit feedback, observing which documents and beliefs are more useful to a user (based on which ones are reviewed, updated, etc.), also propagating feedback and updating beliefs, but with lower weight of confidence than in the case of explicit feedback.

Figure 7:
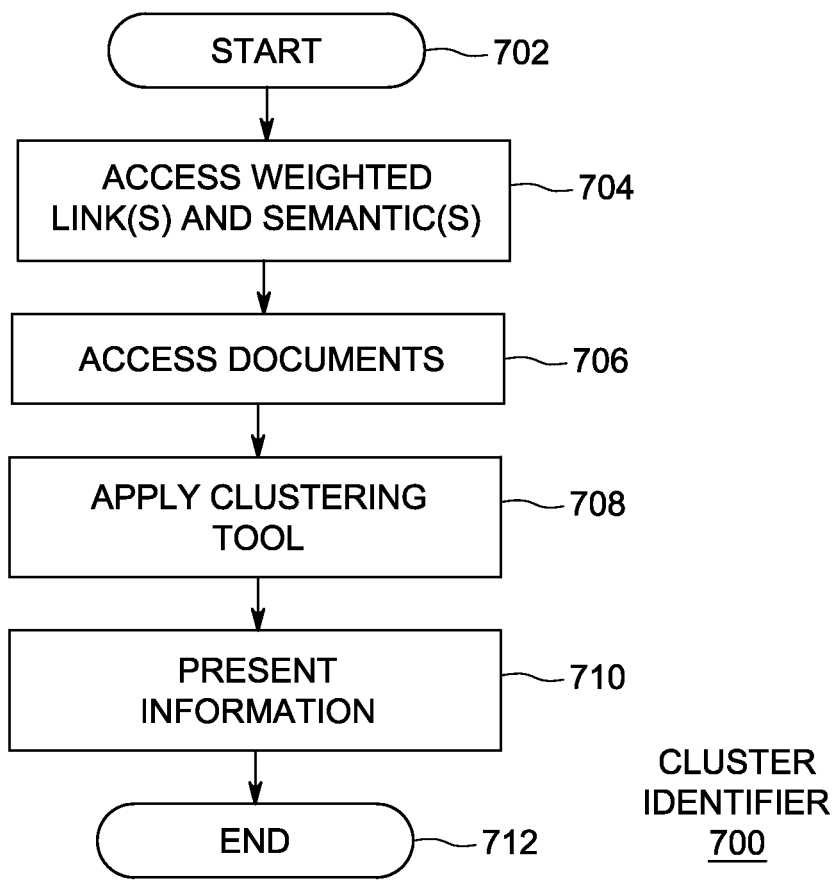
FIG. 7 depicts a flow diagram of a method for identifying clusters amongst data sets in accordance with at least one embodiment of the present invention.

FIG. 7 depicts a flow diagram of a method 700 for identifying clusters amongst data sets in accordance with at least one embodiment of the present invention. The method 700 represents one embodiment of an implementation of the cluster identifier 122 of FIG. 1. The method 700 begins at step 702 and proceeds to step 704. At step 704, method 700 accesses the weighted links and semantics as produced by the content processor 118 of FIG. 1. At step 706, the method 700 accesses documents that are related to the weighted links and semantics.

At step 708, the method applies a clustering tool that clusters documents based upon semantic characteristics. Clustering is a learning algorithm for organizing objects into groups based on their similarity, as evaluated by comparing designated object attributes. Different clustering algorithms (clustering tools) have different characteristics and one may be more appropriate than another for a given problem space. Examples of clustering tools that can be applied to the documents include: LDA, LINGO, KATZ, and the like. LDA (Latent Dirichlet Allocation) facilitates a visual representation of clustered text, such that a user can see why a document was selected for a specific cluster. A most relevant term for each cluster is returned with the clustering results. Each document is assigned to a single cluster. LINGO, unlike other clustering tools, first attempts to discover descriptive names for future clusters and only then proceeds to assigning each cluster with matching documents. In many instances, the descriptive name returned with a cluster is a meaningful phrase. Using LINGO, a document can be assigned to more than one cluster. KATZ uses a linear programming model to determine cluster centroids. The algorithm uses distance matrix built using a document similarity algorithm on the documents. KATZ is used only if all centroids have not been identified within the input criteria. These represent only a few of the many available clustering tools that may be used as a component of various embodiments of the invention.

At step 710, the information gleaned from documents is presented to a user. One embodiment of a format for presenting clustered data is described with respect to FIG. 8. The method 700 ends at step 712.

Figure 8:
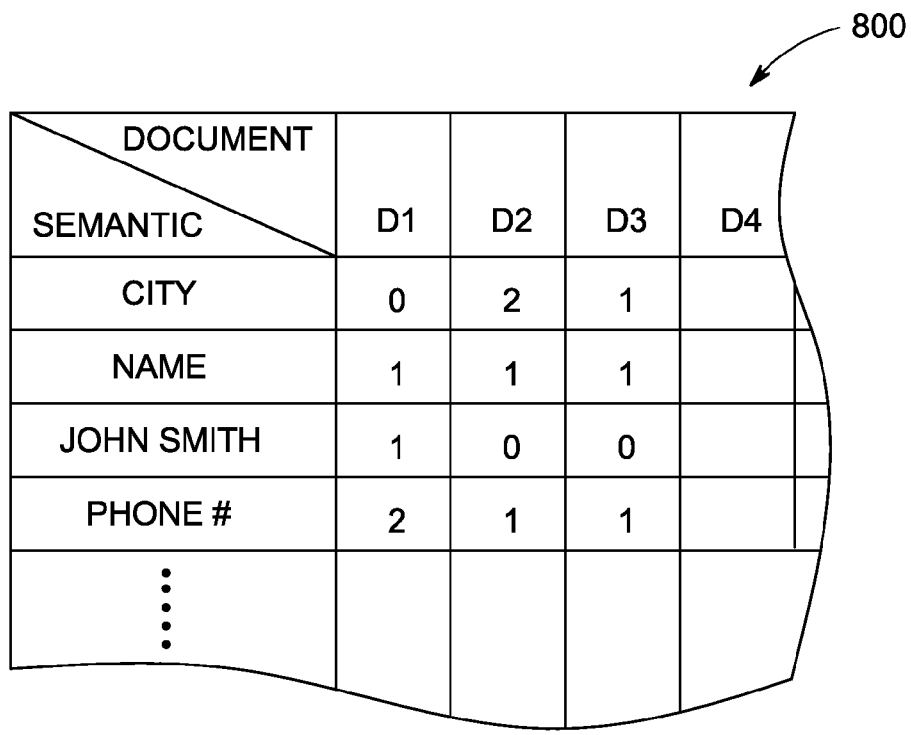
FIG. 8 depicts a chart representing relationships between documents in accordance with at least one embodiment of the invention.

FIG. 8 depicts a chart 800 representing relationships between documents based on semantics within the documents in accordance with at least one embodiment of the invention. The chart 800 comprises columns representing documents D1, D2, D3 . . . and rows representing semantics that may appear in the documents. Each entry in the column represents the number of instances for the particular semantic to appear in a particular document. For example, document D1 comprises zero instances of any city being named, one instance of containing a person's name, one instance of containing the specific person named John Smith, and two instances of a phone number being contained within the document. In some embodiments of the invention, moving the cursor over the document heading creates a pop-up dialog box showing details of the document, e.g., title, author, type of document, publication data and the like. In other embodiments moving the cursor over the semantic fields creates a pop-up dialog box showing specific instances of where the semantic appears in the document.

From the information contained in chart 800, an embodiment of the invention may create graphical depictions and/or lists that show the clustering of particular documents containing common information. The weighting, of the semantics controls the clustering of the documents. In this manner, documents having semantics of high importance with regard to a particular search query will be clustered more readily than documents having semantics with low importance.

Figure 9:
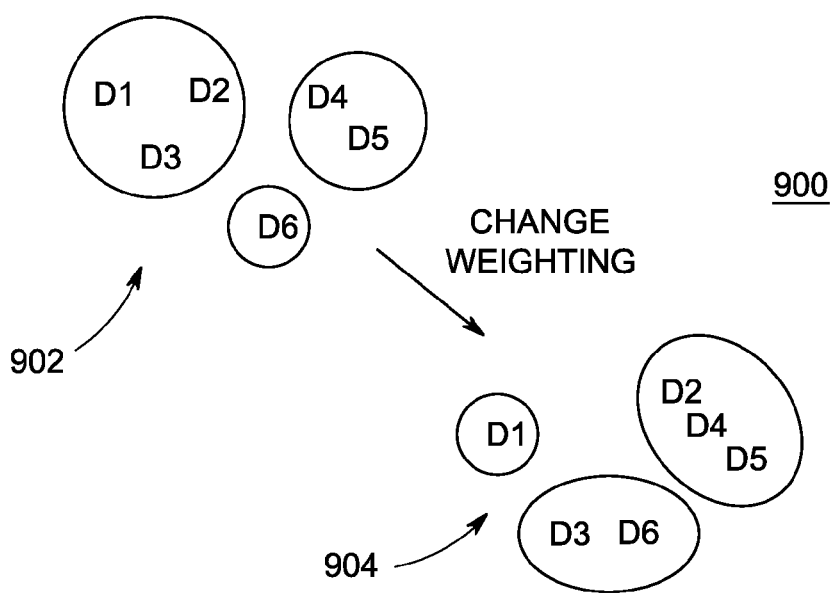
FIG. 9 is a representation of document clustering in accordance with at least one embodiment of the invention.

FIG. 9 is a representation 900 of clustering of documents. An equal weighting of the semantics may create a first cluster 902. The first cluster 902 comprises a grouping of documents D1, D2 and D3; a grouping of documents D4 and D5; and document D6. After changing the weighting of the semantics to non-equal weight, a second cluster 904 is created. The second cluster 904 comprises a grouping of documents D2, D4 and D5; a grouping of documents D3 and D6 and document D1. As described previously with respect to the inference analysis, the weighting values may be modified through artificial intelligence or manually through input from a user. In both instances, the intent of the modification is to improve the output of the search.

Although the cluster identifier 122 and the inference identifier 120 have been described separately as alternative processes, in some embodiments of the invention, both the cluster identifier 122 and the inference identifier 120 are used to gather cluster information as well as extract inferences from the database information. For example documents may be scoured to gather information about various persons. As each person is encountered by name within the documents, a profile is created for the newly discovered person. This profile may contain semantics such as name age, locations visited, people interacted with on such visits, and so on. Documents containing information of specific relevance may be clustered to support the profiling, while an inference analysis may be performed on the profile information to derive relationships between people within the profiles. As more documents are analyzed and more people are discovered, a larger and larger relationship network may be created.

Various elements, devices, modules are described above in association with the respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for performing a semantic-based analysis of a plurality of documents with regard to a query, the method comprising:
   extracting, by a content processor, semantic information from content of a plurality of documents, the semantic information including a plurality of factual beliefs;
   assigning a weight to each of the factual beliefs, the weights being based at least partly on relevance to the query;
   assigning links between documents containing related semantic information;
   assigning a weight to each link indicating a confidence level that the documents comprise semantically related information; and
   determining one or more inferential relationships regarding the query based upon analysis of the plurality of weighted factual beliefs and the links, wherein determining one or more inferential relationships includes applying rules to the weighted factual beliefs and the weighted links to obtain the one or more inferential relationships.

2. The method of claim 1 further comprising accessing semantic characteristics to define the semantic information to be extracted, wherein the semantic characteristics comprise a semantic type and a semantic feature, and the semantic feature is a specific instance of the semantic type.

3. The method of claim 1, wherein the weight assigned to each of the factual beliefs is further based on a frequency of terms associated with the factual beliefs found in the documents.

4. The method of claim 1, wherein the inferring rules and the weights assigned to the links are based on least partly on: proximity of semantics within text of a document, semantics belonging to a mutual collection, proximity of time and geographic location of semantics, and similar verb groupings for semantics.

5. The method of claim 3, further comprising determining at least one inferential relationship among the extracted semantic information from at least two different documents, wherein the at least one inferential relationship is not explicitly stated in the contents of the at least two different documents, and representing the at least one relationship in an inference graph.

6. The method of claim 1 wherein the weights of the assigned links are based at least in part on the semantic information.

7. A computer implemented method for performing a semantic-based analysis of a plurality of documents with regard to a query, the method comprising:
   extracting, by a content processor, semantic information from content of a plurality of documents, the semantic information including a plurality of factual beliefs;
   assigning a weight to each of the factual beliefs, the weights being based at least partly on relevance to the query;
   assigning links between documents containing related semantic information; and assigning a weight to each link indicating a confidence level that the documents comprise semantically related information;
   performing clustering of the plurality of documents by applying a cluster tool to identify documents having content with common information;
   adjusting at least one weight of at least one of the weighted factual beliefs or the weighted links to modify at least one cluster of documents; and
   inferring one or more inferential relationships regarding the query based upon analysis of the plurality of weighted factual beliefs and the links.

8. The method of claim 7, wherein adjusting the at least one weight further comprises applying feedback to the factual belief weights and the link weights, to thereby improve a confidence level of the inferential relationships.

9. An apparatus for performing a semantic-based analysis of a plurality of documents with regard to a query, the apparatus comprising:
   a central processing unit (CPU);
   a content processor for extracting semantic information from content of a plurality of documents, the semantic information including a plurality of factual beliefs, assigning a weight to each of the factual beliefs, the weights being based at least partly on relevance to the query, and assigning links between documents containing related semantic information;
   a cluster identifier that performs clustering of the plurality of documents by applying a cluster tool to identify documents having content with common information, wherein the cluster identifier adjusts at least one weight of at least one of the weighted factual beliefs or the weighted links to modify at least one cluster of documents; and
   an inference identifier that determines one or more inferential relationships regarding the query based upon analysis of the plurality of weighted factual beliefs and the links.

10. The apparatus of claim 9 wherein the semantic information to be extracted is defined by semantic characteristics, wherein the semantic characteristics comprise a semantic type and a semantic feature, and the semantic feature is a specific instance of the semantic type.

11. The apparatus of claim 9, wherein the weight assigned to each of the factual beliefs is further based on a frequency of terms associated with the factual beliefs and wherein the inference identifier applies inferring rules to the weighted semantic information and weighted links.

12. The apparatus of claim 11, wherein the content processor further assigns a weight to each link indicating a confidence level that the documents comprise semantically related information, and
   wherein the inferring rules and the weights assigned to the links are based at least partly on: proximity of semantics within text of a document, semantics belonging to a mutual collection, proximity of time and geographic location of semantics, and similar verb groupings for semantics.

13. The apparatus of claim 9 wherein the inference identifier determines at least one inferential relationship among the extracted semantic information from at least two different documents, wherein the at least one inferential relationship is not explicitly stated in the contents of the at least two different documents, and representing the at least one relationship in an inference graph.

14. The apparatus of claim 11 wherein the content processor defines weights of the assigned links based on the semantic information.

15. The apparatus of claim 9 wherein adjusting the at least one weight further apply feedback to the factual belief weights and the link weights, to thereby improve a confidence level of the one or more inferential relationships.

16. A non-transitory computer readable medium for storing computer instructions that, when executed by a processor, cause the processor to perform a method for performing a semantic-based analysis of a plurality of documents with regard to a query, the method comprising:
   extracting semantic information from content of a plurality of documents, the semantic information including a plurality of factual beliefs;
   assigning a weight to each of the factual beliefs, the weights being based at least partly on relevance to the query;
   assigning links between documents containing related semantic information;
   assigning a weight to each link indicating a confidence level that the documents comprise semantically related information; and
   determining one or more inferential relationships regarding the query based upon analysis of the plurality of weighted factual beliefs and the links, wherein determining one or more inferential relationships includes applying rules to the weighted factual beliefs and the weighted links to obtain the one or more inferential relationships.

* * * * *